United States Patent
Hayden

[11] Patent Number: 6,114,273
[45] Date of Patent: *Sep. 5, 2000

[54] METHOD FOR SOX REMOVAL BY CATALYTIC CARBON

[75] Inventor: Richard A. Hayden, Pittsburgh, Pa.

[73] Assignee: Calgon Carbon Corporation, Pittsburgh, Pa.

[*] Notice: This patent is subject to a terminal disclaimer.

[21] Appl. No.: 08/933,569

[22] Filed: Sep. 19, 1997

Related U.S. Application Data

[63] Continuation-in-part of application No. 08/317,964, Oct. 4, 1994, abandoned, which is a continuation-in-part of application No. 08/008,722, Jan. 21, 1993, Pat. No. 5,352,370.

[51] Int. Cl.$^7$ ............... B01J 21/18; B01J 20/02; B01D 47/00; C01B 17/16
[52] U.S. Cl. ............ 502/180; 502/417; 502/418; 502/423; 423/210; 423/230; 423/235; 423/244.01; 423/244.03; 423/245.1; 95/116; 95/137
[58] Field of Search ............ 423/244.01, 244.03, 423/210, 230, 235, 245.1; 95/137, 116; 502/180, 417, 418, 423

[56] References Cited

U.S. PATENT DOCUMENTS

| | | | |
|---|---|---|---|
| 2,423,702 | 7/1947 | Hart | 252/265 |
| 2,721,184 | 10/1955 | Voorhies Jr. | 252/445 |
| 3,006,346 | 10/1961 | Golding | 131/10 |
| 3,739,550 | 6/1973 | Martin et al. | 95/137 |
| 3,909,449 | 9/1975 | Nagai et al. | 252/422 |
| 3,926,590 | 12/1975 | Aibe et al. | 423/244.03 |
| 4,624,937 | 11/1986 | Chou | 502/180 |
| 4,975,264 | 12/1990 | Franken | 423/522 |
| 5,015,451 | 5/1991 | Holter et al. | 423/235 |
| 5,352,370 | 10/1994 | Hayden | 423/244.09 |
| 5,356,849 | 10/1994 | Matviya et al. | 502/180 |
| 5,733,515 | 3/1998 | Doughty et al. | 423/210 |

OTHER PUBLICATIONS

Stohr, Brigitte et al., Enhancement of the Catalytic Activity of Activated Carbons in Oxidation Reactions by Thermal Treatment with Ammonia or Hydrogen Cyanide and Observation of a superoxide species as a possible intermediate, Carbon, pp. 707–720, 1991.

Primary Examiner—Gary P. Straub
Assistant Examiner—Melanie Wong
Attorney, Agent, or Firm—Titus & McConomy LLP

[57] ABSTRACT

An improved process is provided for the removal of sulfur oxides from gas or vapor media containing oxygen and $H_2O$ by contacting the media with a catalytically-active carbonaceous char. The improvement is provided by the use of a catalytically-active carbonaceous char prepared by low-temperature carbonization and oxidation of a bituminous coal or bituminous material at temperatures below 700° C., followed by contact of the carbonized, oxidized char with one or more nitrogen-containing compounds at a temperature which is stable at, or is increasing to, temperatures less than 700° C., and then increasing the temperature of the resultant material to or above 700° C.

6 Claims, No Drawings

METHOD FOR SOX REMOVAL BY CATALYTIC CARBON

CROSS-REFERENCE

This is a continuation-in-part application of U.S. patent application Ser. No. 08/317,964 filed Oct. 4, 1994, now abandoned, which is a continuation-in-part of Ser. No. 08/008,722 now U.S. Pat. No. 5,352,370 filed Jan. 21, 1993, entitled Method for SOx Removal by Catalytic Carbon.

FIELD OF THE INVENTION

The present invention relates to the use of a catalytic carbonaceous material for the removal of sulfur oxides from a gas or vapor media containing oxygen and $H_2O$.

BACKGROUND OF THE INVENTION

As restrictions on the emission of acid rain precursors such as sulfur dioxide have grown in recent years, a corresponding need has arisen for technologies capable of removing such compounds from gaseous streams in which they are present. Examples of such gaseous streams include flue gases from incinerators and fossil-fueled power plants. It is well known to use activated carbons and cokes for the removal of sulfur dioxide from such streams, especially above 100° C. Below 100° C. and in the presence of oxygen and water, carbonaceous chars can act as catalysts for the oxidation of sulfur dioxide to sulfuric acid. However, the rate of reaction is usually so low that the loadings and concentrations of sulfuric acid which accumulate on the char are rarely of commercial interest.

The use of metals supported on carbonaceous chars has been found to improve the rate of oxidation of SOx. However, such chars containing impregnated metals have inherent disadvantages which may limit their use. For example, the metals may be leached from the carbon surface, contaminating the recovered sulfuric acid. As metal is lost from the carbon surface, the carbon-supported catalyst may also become less effective. Finally, at the end of its useful life, the spent metal-impregnated carbon may become an environmental and disposal problem because of the impregnated metals, many of which are environmentally hazardous. Given these potential liabilities, the use of a carbonaceous char which does not contain impregnated metals would be preferred if a char with suitable inherent catalytic activity were available.

The use of high-temperature carbonaceous chars containing no impregnated metals and treated with nitrogen-containing compounds or prepared from nitrogen-rich starting materials have shown particular promise for SOx removal. For example, improvements in the rate of oxidation of sulfur (IV) to sulfur (VI) have been achieved in the liquid phase using high-temperature, nitrogen-poor carbonaceous chars which have been heated at temperatures above about 700° C. in the presence of ammonia or other nitrogen-containing substances. Improved direct gas-phase oxidation of sulfur dioxide has been achieved for high-temperature nitrogen-poor chars contacted with melamine or its derivatives at temperatures above about 700° C. Other carbonaceous chars have been used for the enhanced liquid-phase and gas-phase oxidation of sulfur (IV). These carbonaceous chars were derived from nitrogen-rich starting materials such as polyacrylonitrile. Also, a char suitable for the catalytic oxidation of sulfur (IV) has been produced wherein a high-temperature nitrogen-poor activated carbon or coke was oxidized by sulfur (VI) and exposed to a nitrogen-containing ammonia salt at temperatures above 350° C.

The prior art methods for improving the inherent catalytic capabilities of carbonaceous materials for sulfur (IV) oxidation have certain disadvantages which limit their overall utility. For example, most of these teachings utilize high-temperature chars as starting materials. High-temperature carbonaceous chars are those produced by thermal treatment at temperatures equal to or greater than 700° C. Low-temperature chars have not experienced temperatures greater than 700° C. Since high-temperature carbonaceous chars are fairly inert chemically, the use of aggressive chemical post-treatments is usually required to effect significant changes in their catalytic capabilities. One exception is the use of an expensive synthetic starting material such as polyacrylonitrile. However, this is also disadvantageous due to the high costs of such materials. The use of high-temperature finished chars as starting materials also is inevitably more expensive than the direct use of the raw materials from which they are made. In some processes for the production of these chars, large quantities of toxic process byproducts such as sulfur dioxide and cyanide are unavoidably produced, while others require the use of highly hazardous treatment agents such as sulfuric acid.

Accordingly, it is the object of the present invention to provide an improved process for the removal of sulfur oxides from gas or vapor media containing oxygen and $H_2O$ using a carbonaceous char catalyst prepared directly from a nitrogen-poor, naturally-occurring starting material such as a bituminous coal or a bituminous material. It is also the object of the present invention to provide significant removal of sulfur oxides by the use of a carbonaceous char which contains no impregnated metals. It is further the object of the present invention to limit the use of agents responsible for imparting catalytic activity to the carbonaceous char by performing the essential treatments at low temperatures (less than 700° C.) and during transition of the starting material to the final product. These treatments include low-temperature (less than 700° C.) carbonization and oxidation of the starting material to produce a low-temperature oxidized char, preferably by inexpensive, abundant, relatively non-toxic oxidants such as air, and contacting of the oxidized low-temperature char with one or more nitrogen-containing compounds prior to, not after, the initial exposure of the char to high temperatures (greater than or equal to 700° C.). The preferred nitrogen-containing compounds are inexpensive, abundant, and relatively non-toxic agents such as urea or melamine, although other nitrogen-containing compounds may also be used including ammonia and derivatives of urea, melamine and ammonia. By this method, carbonaceous chars with high catalytic activity, per se, for the oxidation of sulfur (IV) in the presence of oxygen and $H_2O$ can be produced with minimal departure from conventional processes for the production of high-temperature carbonaceous chars such as activated carbons and cokes.

SUMMARY OF THE INVENTION

Generally, the present invention comprises the removal of sulfur (IV) from a gaseous or vaporous media containing oxygen and $H_2O$ by the catalytic action of carbonaceous chars. These chars are prepared by the low-temperature (less than 700° C.) carbonization and oxidation of a nitrogen-poor feed stock, followed by contact of the oxidized low-temperature char with one or more nitrogen-containing compounds while the temperature of the char is stable at, or is increasing to, temperatures less than 700° C., and thereafter increasing the temperature to or above 700° C.

The preferred nitrogen-poor feedstock is a bituminous material such as bituminous coal. Other suitable bituminous materials include (1) higher rank coals, including anthracite coal and semi-anthracite coal, treated with alkali metals, or (2) lower rank coals or bitumens, including peat, lignite and sub-bituminous coal, treated with mineral acids, hydroxides, or metal salts, or (3) ligno-cellulose materials treated with mineral acids, hydroxides or metal salts. Suitable mineral salts include zinc chloride, suitable mineral acids include phosphoric acid.

It is further preferred that the carbonaceous char contains no impregnated metals. Such impregnation is distinct from the metal salt and metal alkali treatments discussed above, which do not involve metal impregnation in the char and, as known by those skilled in the art, involve removal of the metal involved in such treatments after the treatments are completed.

In a preferred embodiment of this invention, the feedstock material is pulverized, mixed as necessary with small amounts of a suitable binder, such as pitch, briquetted or otherwise formed, and sized. The sized material is then carbonized and extensively oxidized at temperatures less than 700° C., preferably less than 400° C. The oxidation is continued until additional gains in the catalytic activity of the final product are no longer evident or until the desired improvement in catalytic activity is achieved. The oxidation is well beyond that typically required to remove the coking properties of bituminous coals and produces an optimally oxidized carbonaceous char. Other convenient means of oxidation can also be used to effect the low-temperature oxidation and carbonization of the starting material.

The oxidized low-temperature carbonaceous char is then contacted with small amounts of an inexpensive, abundant, and relatively non-toxic nitrogen-containing compound, such as urea or derivatives thereof containing at least one nitrogen atom having an oxidation number less than that of elemental nitrogen. The preferred nitrogen-containing compounds are inexpensive, abundant, and relatively non-toxic agents such as urea or melamine, although other nitrogen-containing compounds may also be used including ammonia and derivatives of urea, melamine and ammonia. Contact of the oxidized char with the nitrogen-containing compound or compounds is carried out at temperatures less than 700° C. and prior to, not after, the initial exposure of the contacted, oxidized low-temperature char to temperatures equal to or greater than 700° C.

The amounts of nitrogen-containing compounds used are typically small, preferably less than 5% by weight of the oxidized low-temperature char or such that additional gains in the catalytic activity of the final product are no longer evident. The heating of the contacted, oxidized low-temperature char to temperatures equal to or greater than 700° C., also called calcination, is preferably conducted under an atmosphere that is inert except for the gases and vapors attributable to the carbonaceous char and/or the nitrogen-containing compound. The heating rate and temperatures are preferably selected such that additional gains in the catalytic activity of the final product are no longer evident. The resultant nitrogen-treated high-temperature carbonaceous char may then be activated to the desired density at temperatures above 700° C. using at least one of $H_2O$, $CO_2$, $O_2$ and air. The calcined or calcined/activated carbonaceous char is then cooled in an oxygen-free or otherwise inert atmosphere to temperatures less than 400° C., preferably less than 200° C. Additional gains in catalytic activity may be realized by repeating the oxidation/exposure to nitrogen-containing compounds/calcination or calcination/ activation/inert cooling as many times as may be desired. Alternatively, any other method known to generate catalytic activity in high-temperature chars may be applied to the resultant product to further enhance its catalytic activity.

PRESENTLY PREFERRED EMBODIMENTS

The utility of the invention is illustrated by the following two examples. Example 1 demonstrates the $SO_2$ removal capability of a commercial activated carbon of the prior art. Example 2 demonstrates the $SO_2$ removal capability of the present invention. Comparison of these two examples shows that the performance of the present invention greatly exceeds that of a typical activated carbon.

Example 1

A commercially-available activated carbon, BPL (manufactured by Calgon Carbon Corporation, Pittsburgh Pa.) was crushed and sized to less than 14 mesh and greater than 20 mesh (U.S. Standard Series sieves). The sized carbon was placed into a column having an inside diameter of 18 mm to a bed depth of 76 mm. At ambient pressure and temperature, a humidified gas stream was passed through this column at a flow rate of 1000 cc per minute. The composition of the gas stream on a dry basis was nominally 500 ppmv $SO_2$ and 500 ppmv $O_2$ with the balance as $N_2$. This dry stream was humidified to between 50% and 80% relative humidity prior to its introduction into the carbon-containing column. The column effluent was monitored and the elapsed time required to achieve a 10 to 15 ppmv $SO_2$ breakthrough was determined. This sample of commercially available activated carbon achieved breakthrough in approximately 4 hours.

Example 2

Bituminous coal was pulverized, mixed with about 4 to 6% coal tar pitch, and briquetted. The resultant briquettes were crushed and sized to produce an approximately less than 4 mesh size and greater than 10 mesh size (U.S. Standard Series sieves) material. In the presence of large quantities of excess air, this material was oxidized by heating from 100° C. to 200° C. at a rate of 200° C. per hour, then from 200° C. to 350° C. at a rate of 100° C. per hour, then held at 350° C. for 5 hours, and finally heated from 350° C. to 450° C. at a rate of 100° C. per hour. The resultant oxidized material was cooled to near ambient temperatures in a low oxygen content atmosphere, sized to produce an approximately less than 4 and greater than 6 mesh size (U.S. Standard Series sieves) material, and subsequently impregnated with an aqueous urea solution and dried. The quantity of urea solution used was sufficient to produce a 4% urea loading on a dry weight basis. After impregnation, a portion of the oxidized, impregnated low-temperature char was rapidly heated to 950° C. under an inert gas atmosphere and maintained at that temperature for 1 hour. Immediately following this calcination treatment the resultant material was activated with steam at 950° C. After activation, the material was cooled to ambient temperature under an inert atmosphere. The catalytically-active activated carbonaceous char so produced, when sized to less than 4 mesh (U.S. Standard Series Sieves) and greater than 6 mesh (U.S. Standard Series Sieves) exhibited an Apparent Density (Test Method TM-7, Calgon Carbon Company, Pittsburgh Pa.) of 0.480 grams per cc.

The catalytically-active activated carbonaceous char prepared as described above was crushed and a less than 14 mesh and greater than 20 mesh sized portion of this sample was evaluated for $SO_2$ removal in a manner identical to that described in Example 1. The column effluent was monitored and the elapsed time required to achieve a 10 to 15 ppmv breakthrough determined. This sample of catalytically-active activated carbonaceous char achieved breakthrough in approximately 15 hours.

While the presently preferred embodiment of the invention has been described, it may be otherwise embodied within the scope of the appended claims.

What is claimed is:

1. A process for the removal of sulfur oxides from gaseous or vapor media which process comprises contacting said media, in the presence of oxygen and $H_2O$, with a carbonaceous char, said carbonaceous char having been prepared by a. carbonizing a bituminous material selected from the group consisting of (i) bituminous coals, (ii) high rank, anthracite or semi-anthracite coals treated with alkali metals, (iii) low rank or sub-bituminous coals or bitumens, peat, lignite or ligno-cellulose materials treated with mineral acids, hydroxides or metal salts;

b. oxidizing said bituminous material at temperatures below 700° C. during or after said carbonization; and c. contacting said carbonized and oxidized bituminous material with one or more nitrogen-containing compounds prior to, not after, exposure of such material to temperatures equal to or greater than 700° C.

2. The process of claim 1 wherein said carbonaceous char is activated at temperatures above 700° C. using at least one of $H_2O$, $CO_2$, $O_2$ and air.

3. The process of claim 1 wherein said nitrogen-containing compounds are selected from the group consisting of urea, melamine, ammonia and derivatives thereof.

4. The process of claim 1 wherein said carbonaceous char is cooled to temperatures less than 400° C. in an oxygen-free or inert atmosphere after the temperature is increased to above 700° C.

5. The process of claim 2 wherein said activated carbonaceous char is cooled to temperatures less than 400° C. in an oxygen-free or inert atmosphere after activation at temperatures above 700° C.

6. The process of claim 1 wherein said carbonaceous char contains no impregnated metals.

* * * * *